United States Patent
Raley et al.

(10) Patent No.: US 10,057,368 B1
(45) Date of Patent: *Aug. 21, 2018

(54) METHOD AND SYSTEM FOR INCREMENTAL CACHE LOOKUP AND INSERTION

(71) Applicant: Google LLC, Mountain View, CA (US)

(72) Inventors: John Raley, San Francisco, CA (US); Ethan Solomita, San Francisco, CA (US)

(73) Assignee: Google LLC, Mountain View, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 15/089,991

(22) Filed: Apr. 4, 2016

Related U.S. Application Data (63) Continuation of application No. 13/739,987, filed on Jan. 11, 2013, now Pat. No. 9,317,470.

(60) Provisional application No. 61/586,677, filed on Jan. 13, 2012.

(51) Int. Cl.
*G06F 15/167* (2006.01)
*H04L 29/08* (2006.01)

(52) U.S. Cl.
CPC .............. *H04L 67/2842* (2013.01)

(58) Field of Classification Search
CPC .................................................. H04L 67/2842
USPC ................ 709/212, 213, 214, 215, 216, 217
See application file for complete search history.

(56) References Cited

U.S. PATENT DOCUMENTS

| | | | |
|---|---|---|---|
| 5,742,806 A | 4/1998 | Reiner et al. | |
| 7,493,451 B2 | 2/2009 | Kadambi et al. | |
| 8,266,176 B2 | 9/2012 | Nakamura et al. | |
| 9,152,626 B2 | 10/2015 | Seufert et al. | |
| 2005/0097085 A1 | 5/2005 | Shen et al. | |
| 2010/0325303 A1 | 12/2010 | Wang et al. | |
| 2012/0117509 A1 | 5/2012 | Powell et al. | |
| 2012/0158884 A1 | 6/2012 | Hatano | |

OTHER PUBLICATIONS

U.S. Notice of Allowance in U.S. Appl. No. 13/739,987 dated Dec. 15, 2015.
U.S. Office Action in U.S. Appl. No. 13/739,987 dated Dec. 18, 2014.
U.S. Office Action in U.S. Appl. No. 13/739,987 dated Jul. 22, 2015.

*Primary Examiner* — Joseph E Avellino
*Assistant Examiner* — Marshall M McLeod
(74) *Attorney, Agent, or Firm* — McDermott Will & Emery LLP (57) ABSTRACT

Methods, systems, and articles of manufacture for caching are disclosed. These include incrementally reading a cache by, receiving a request from a client to retrieve an object from a cache; comparing a size of the requested object to a threshold retrieval size; transmitting a response including an incremental lookup indicator to the client when the size is greater than the threshold retrieval size; receiving one or more follow-on requests including the incremental lookup indicator from the client; responsive to each of the follow-on requests, retrieving a portion of the requested object from the cache; and transmitting the retrieved portion to the client. Corresponding incremental insertion of data items into the cache are also disclosed.

20 Claims, 7 Drawing Sheets

METHOD AND SYSTEM FOR INCREMENTAL CACHE LOOKUP AND INSERTION

CROSS-REFERENCE TO RELATED APPLICATION

The present application is a continuation of, and claims the benefit of and priority to, U.S. application Ser. No. 13/739,987, filed on Jan. 11, 2013, issuing as U.S. Pat. No. 9,317,470 on Apr. 19, 2016, and which claims the benefit of U.S. Provisional Patent Application Ser. No. 61/586,677, filed on Jan. 13, 2012, both titled "Method and System for Incremental Cache Lookup and Insertion," each of which are hereby incorporated by reference in their entirety for all purposes.

FIELD

This disclosure relates generally to caching of data items.

BACKGROUND

In many computing environments, caches are used to transparently store data items in order to serve that content faster in response to future requests. Many types of data items, for example, video, images, documents, query results, objects, or other types of data structures may be cached. Caching can reduce the latency involved in serving content to requesters. Caching can also reduce network traffic by enabling a server to serve content that is frequently requested from a local storage rather than by making frequent retrievals from a remote location over a wide area network.

In web environments, caching is frequently used by web browsers as well as by servers. The servers that may use caching include origin servers as well as proxy servers. A web browser, executing on a client device, may locally cache data so that the number of Hyper Text Transfer Protocol (HTTP) requests to remote web servers may be reduced. A proxy server may maintain a cache so that it may reduce repeated requests to origin servers for data items that are repeatedly requested by clients. For example, when a proxy server encounters a request for an object for the first time, it requests that object from an origin server over a wide area network and stores a copy of it in a local cache. Subsequent requests for that object may be serviced by retrieving that object from the local cache rather than from the remotely located origin server. Upon subsequent requests, the proxy server would first seek to retrieve the object from the local cache, and would request the origin server for the object only if the sought object is not cached. However, in many environments, proxy servers such as HTTP proxy servers, concurrently service numerous requests for various types of data items. Concurrently servicing numerous requests for large data items can lead to scalability and performance concerns with respect to caching.

SUMMARY OF EMBODIMENTS

Methods, systems, and articles of manufacture for using a cache are disclosed. These include looking up a cache by, receiving a request from a client to read a data item from a cache; comparing a size of the requested data item to a threshold retrieval size; transmitting a response including an incremental lookup indicator to the client if the size is greater than the threshold retrieval size; receiving one or more follow-on requests including the incremental lookup indicator from the client; responsive to each of the follow-on requests, retrieving a portion of the requested data item from the cache; and transmitting the retrieved portions to the client.

These also include writing to a cache by, comparing a size of a data item to be cached to a threshold insert size; if the size is greater than the threshold insert size, transmitting a first request to write the data item to a cache, where the first request includes a first portion of the data item and an indication that more portions of the data item are to follow; receiving one or more responses from the cache, where each of the responses includes an incremental insert indicator; and responsive to each of the received one or more responses, transmitting a follow-on request to the cache including a next portion of the data item and the corresponding incremental insert indicator.

Further features and advantages, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the present disclosure is generally described in the context of these embodiments, it should be understood that these embodiments are not limiting as to scope.

DETAILED DESCRIPTION

While illustrative embodiments for particular applications are described in the present disclosure, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

Web servers, such as HTTP proxy servers in particular, concurrently service requests from numerous users. The concurrent servicing of numerous requests imposes a high level of demand on the local memory of web servers and associated caches. When a conventional proxy server attempts to service a large number of concurrent requests for large objects, it may make numerous calls to a cache to access the objects. Simultaneously retrieving numerous large objects may, however, cause memory and local network congestion at the conventional proxy server. Denial of service attacks, such as, by automated web clients making numerous concurrent requests in order to overwhelm the web infrastructure, may cause severe memory congestion due to repeated and highly frequent accesses to cache to obtain entire large objects even in response to web clients that momentarily disconnect without waiting for the response after issuing the request for an object.

The present disclosure is generally directed to methods and systems for caching. Embodiments disclosed herein can be used, for example, to improve the scalability of caches in web environments, such as, caches used by HTTP proxy servers or other web servers. According to an embodiment, an HTTP proxy server retrieves cached objects in portions rather than as entire objects. By retrieving cached objects in portions, the proxy server may limit the amount of consumed local memory even when reading an object of a large or unknown size. The proxy server may coordinate its retrieval of portions of the large object from the cache with the writing of the retrieved portions to requesting web clients. Another embodiment enables the proxy server to insert large objects in portions into the cache, rather than as entire objects. By reading and/or writing objects in portions from/to their caches, the proxy servers may limit consumption of their local resources and alleviate many issues associated with concurrently servicing large numbers of requests. According to some embodiments, the proxy server can coordinate the incremental cache accesses for content with the corresponding communication with web clients using that content.

Figure 1:
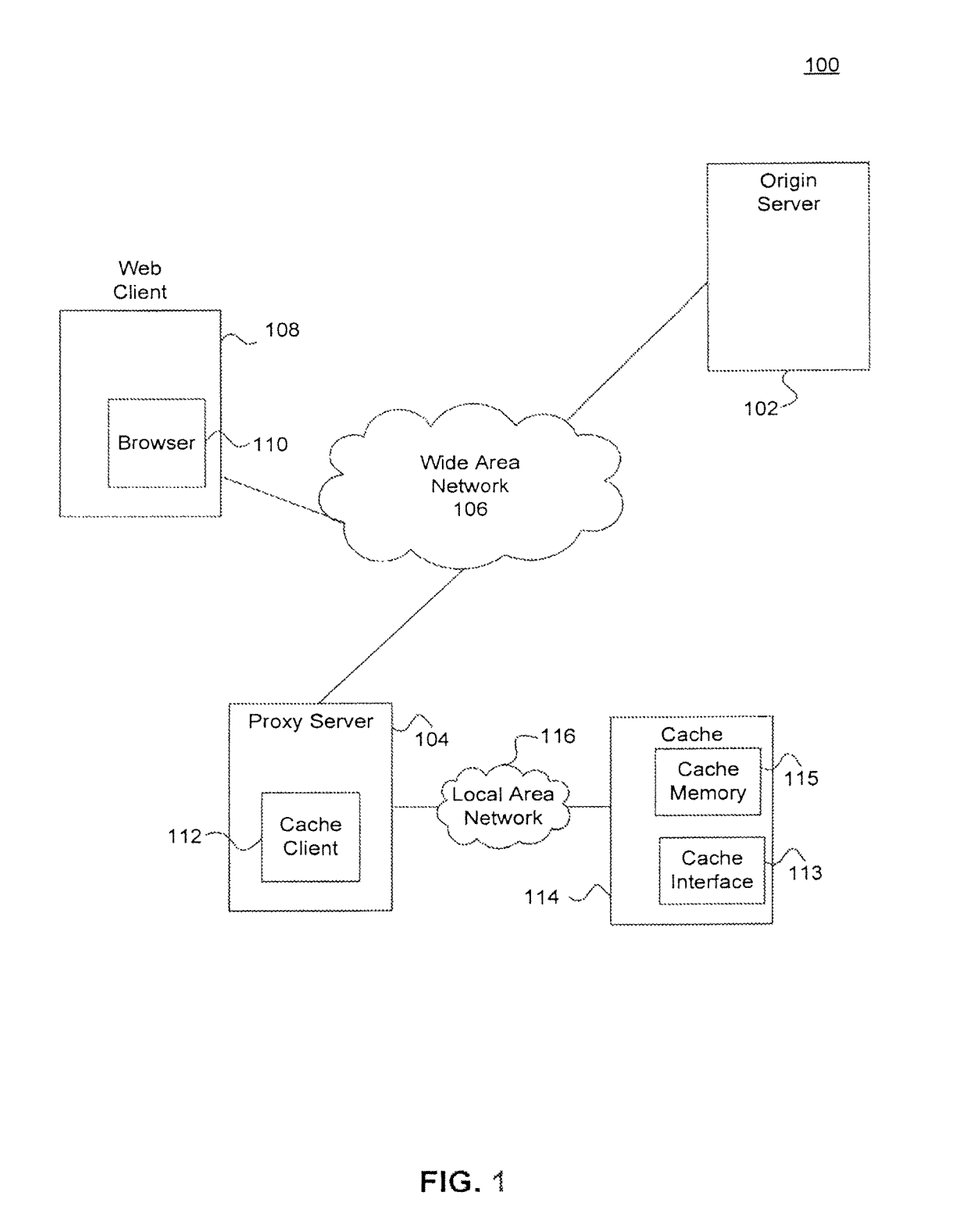
FIG. 1 illustrates a system for cache lookup and insertion, according to an embodiment.

FIG. 1 illustrates a system for cache lookup and insertion, in accordance with an embodiment. A browser 110 executing in a web client 108 (also referred to as "user") requests a data item by specifying, for example, a uniform resource locator (URL) corresponding to that data item. A URL, as conventionally known, represents the address of a data item. The URL may resolve to origin server 102 which stores the requested content, or to proxy web server 104. Proxy web server 104 (also referred to as "proxy server") may intercept the request from web client 108. Proxy web server 104 may access a cache 114 over a local network to retrieve the requested data if it is available in cache 114. Cache 114 includes cache memory 115 for storing cached data items and cache interface 113 to lookup or insert cached data. A cache client 112, in proxy server 104, may communicate with cache interface 113 in cache 114 in order to read from, or write to, cache 114. Cache 114 stores cached data items in a cache memory 115. Cached data items may include any type of data. According to an embodiment, cache 114 includes an object cache, which caches objects including the data and corresponding access routines. When the requested data item is not available from cache 114, proxy server 104 may request that data item from origin server 102 over a network, such as wide area network 106. By maintaining frequently requested data items in cache 114, proxy server 104 may service requests from web client 108 with less latency and less network traffic over WAN 106 when compared to requesting the data item from origin server 102.

Proxy server 104 may be communicatively coupled to origin server 102 and web client 108 through wide area network (WAN) 106, and to cache 114 through local area network (LAN) 116. According to another embodiment, proxy server 104 may connect to web client 108 over a LAN. WAN 106 can include any network or combination of networks that can carry data communication. These networks can include, for example, one or more LANs or a network such as the Internet. LAN and WAN networks can include any combination of wired (e.g., Ethernet) or wireless (e.g., Wi-Fi, 3G, or 4G) network components.

Proxy server 104, cache 114, origin server 102, and web client 108 can be implemented on any computing device. Proxy server 104 may be capable of handling a high volume of HTTP requests for service from web clients. Web client 108 may include, for example, a mobile computing device (e.g. a mobile phone, a smart phone, a personal digital assistant (PDA), a navigation device, a tablet, or other mobile computing devices), a personal computer, a workstation, a set-top box, or other computing device on which a web browser or other web application can execute. Cache 114 interacts with proxy server 104 to cache data items that are transferred between the proxy server and web clients. Cache 114 can be implemented in one or more caching servers that are physically separated from the servers for which caching is provided. According to another embodiment, cache 114 may be implemented as part of the server for which caching is provided. Origin server 102, proxy server 104, and cache 114 may include, but are not limited to, a central processing unit, an application-specific integrated circuit, a computer, workstation, a distributed computing system, a computer cluster, an embedded system, a stand-alone electronic device, a networked device, a rack server, a set-top box, or other type of computer system having at least one processor and memory. A computing process performed by a clustered computing environment or server farm may be carried out across multiple processors located at the same or different locations. Hardware can include, but is not limited to, a processor, memory, network interface, and a user interface display.

Figure 2:
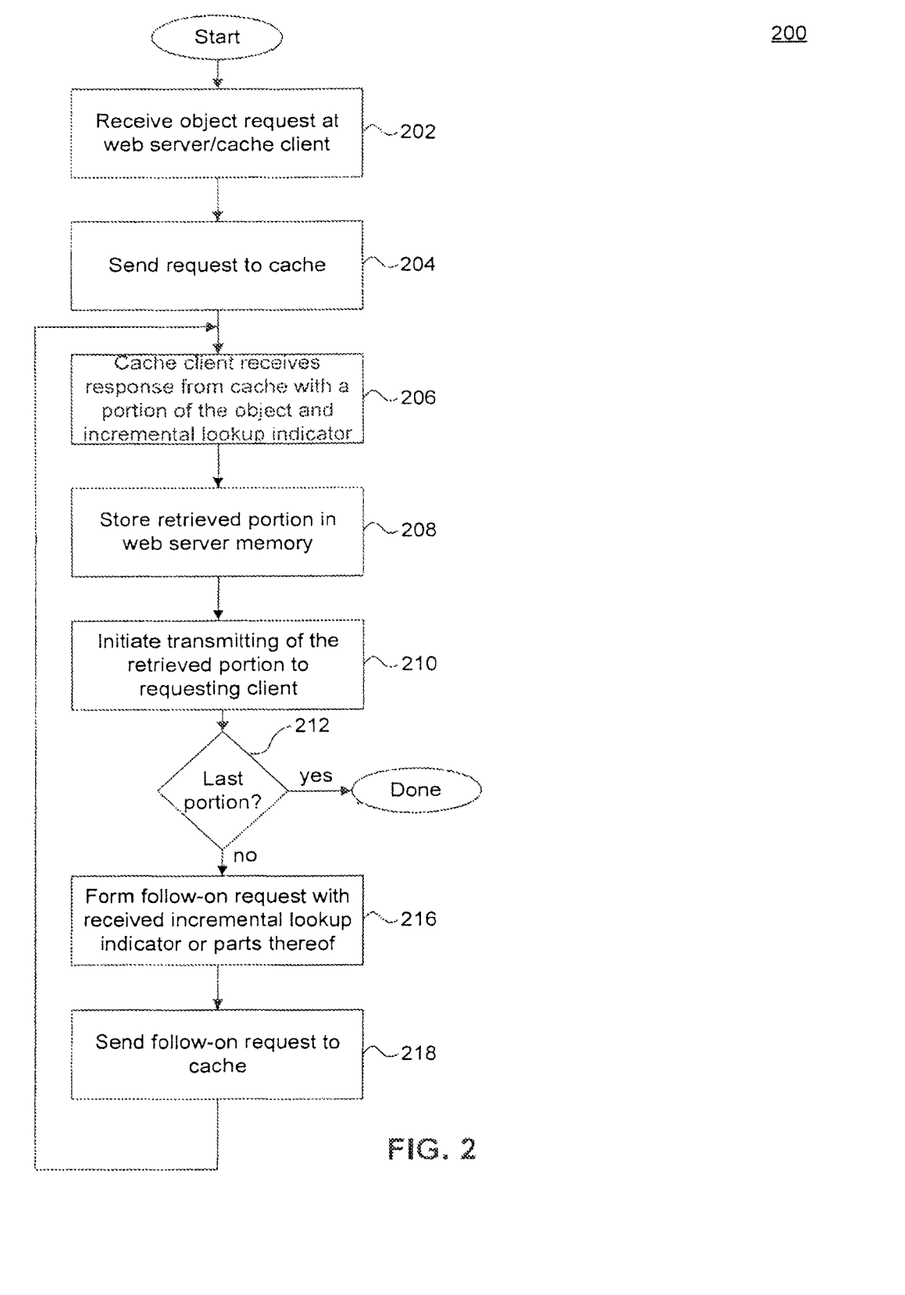
FIG. 2 illustrates a flowchart of a method for a cache client to read cached data, according to an embodiment.

FIG. 2 illustrates a flowchart of a method 200 (stages 202-218) for cache lookup at a cache client, in accordance with an embodiment. According to an embodiment, method 200 can be used by cache client 112 in proxy server 104 to access cache 114 to retrieve data items in order to service requests from web client 108.

At stage 202, a request for an object may be received. For example, a request for an object, specified by a web client using a URL, may be received by a proxy server. The proxy server may include a cache client that interacts with a cache associated with the proxy server.

At stage 204, the cache client requests the object from the cache. Stage 204 may include determining whether the requested object is a cacheable object, and a request to the cache may be made only if the requested object is determined to be a cacheable object. According to some embodiments, some types of data items and/or objects may be configured as cacheable. In other embodiments, any data item or object may be cacheable. The cache may store any type of data, including objects. Exemplary cached objects include HTTP pages, images, video, documents, and other data items. The cache may be local to the cache client (e.g., cache client and cache located in the same computing device) or the cache and the cache client may be interconnected via a local area network. The request may be formed at the cache client, and may include a cache key to identify the requested object. According to an embodiment, the cache key is determined based upon the URL of the requested object. In some embodiments, the cache key may be based on other information associated with the respective requested objects. The message exchange between the cache client and the cache can be in accordance with a configured application programming interface (API) between the two entities. For example, the API may be implemented by cache client 112 in proxy server 104 and cache interface 113 of cache 114.

At stage 206, the cache client receives a response from the cache. According to an embodiment, the response includes a portion of the requested object and an incremental lookup indicator. The incremental lookup indicator is generated by the cache to indicate to the cache client whether or not additional portions of the requested object are available for retrieval in the cache. The incremental lookup indicator may include a content identifier (content-id) that identifies the object being accessed. According to an embodiment, the content-id identifies the instance of the object being accessed. In addition, the incremental lookup indicator may include a lookup identifier (lookup-id), for example, indicating the beginning of the portion of that object to be returned next from the cache.

At stage 208, the received response is stored in the local memory of the proxy server. Specifically, the portion of the requested object returned in the received response and the returned incremental lookup indicator are stored in the proxy server.

At stage 210, the proxy server begins transmitting the already retrieved object data to the requestor. According to an embodiment, the proxy server may transmit the retrieved object data to the requesting web client using the HTTP protocol. For example, HTTP streaming may be used to transmit incrementally retrieved cached objects from the server to the requesting user.

At stage 212, it is determined whether the current received portion is the last portion of the requested object. If the last portion has been received, method 200 terminates. If the last portion has not been received, processing in method 200 proceeds to step 216.

At stage 216, the cache client forms a follow-on request. The follow-on request includes the incremental lookup indicator, or parts thereof, received from the cache. For example, the follow-on request can include, in addition to the cache key corresponding to the object, the content-id and the lookup-id last received from the cache. By including the incremental lookup indicator in the follow-on request, the cache client can indicate to the cache the instance of the object from which data is being read. The incremental lookup indicator may also indicate to the cache the portion of the object to be next retrieved.

At stage 218, the cache client sends the formed follow-on request to the cache.

Stages 206-218 can be repeated until the entire requested object has been received by the cache client.

Figure 3:
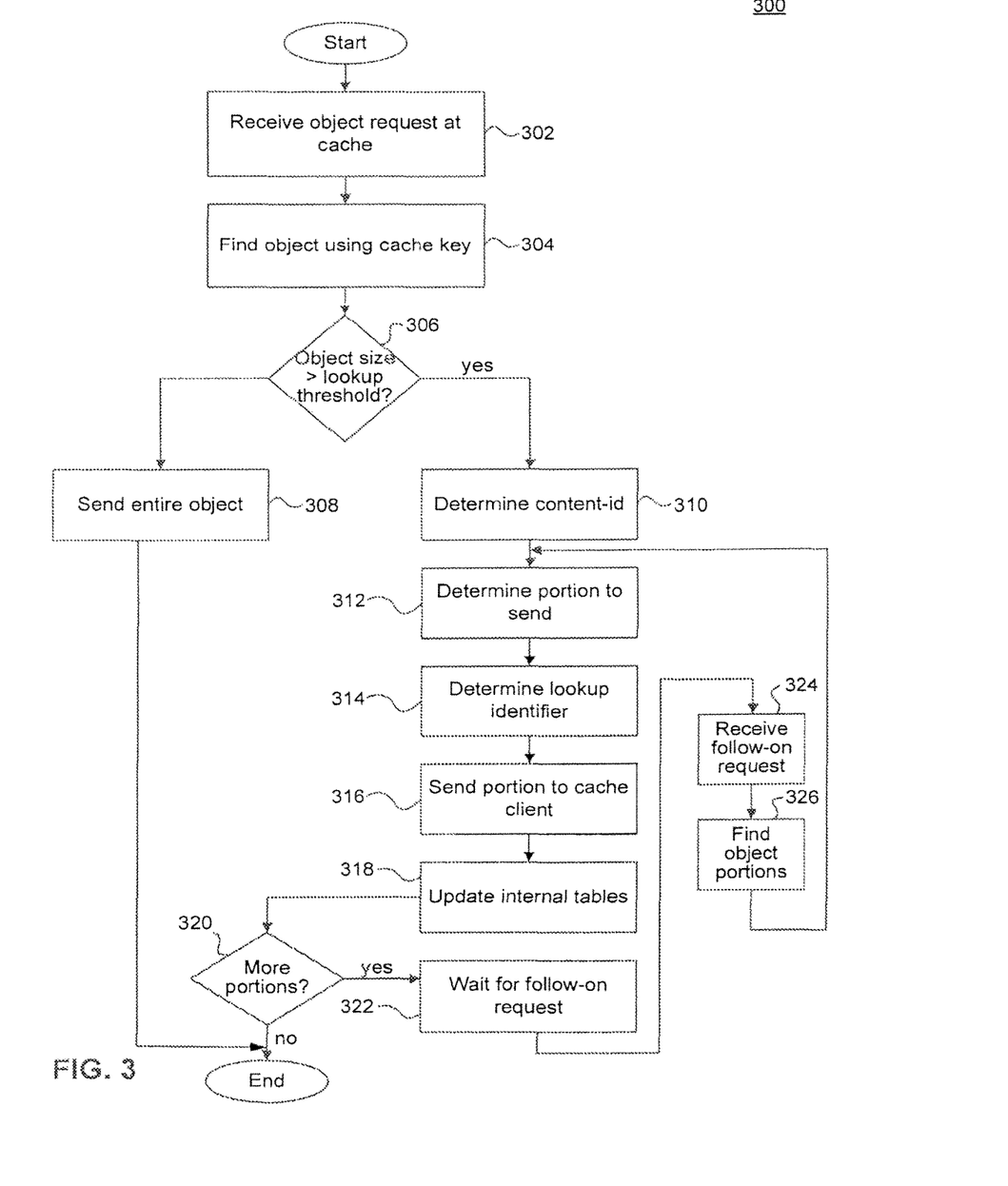
FIG. 3 illustrates a flowchart of a method for cache to read cached data, according to an embodiment.

FIG. 3 illustrates a flowchart of a method 300 (stages 302-320) for cache lookup at a cache, according to an embodiment. Method 300 can be performed, for example, by cache 114 when receiving an object read request from cache client 112 in proxy server 104.

At stage 302, a read request for an object is received at the cache. The request may be received from a web server, such as, but not limited to, a proxy server. The read request may include a cache key corresponding to the object to be retrieved.

At stage 304, the cache searches for the requested object using the received cache key. The search may include searching a hash index using the received cache key. If the search does not find a requested object, then a cache miss has occurred and the cache returns an error to the cache client.

If the requested object is found at stage 304, then at stage 306, it is determined whether the size of the requested object is greater than a threshold retrieval size. The threshold retrieval size may be a configured parameter representing a maximum size of an object to be returned as a single object. The threshold retrieval size may be specified in bits, bytes, or any other measure suited for representing the size of objects in computer systems. The threshold retrieval size may be preconfigured, or, in some embodiments, may be dynamically determined based upon system conditions. The threshold retrieval size may also be configured differently based upon the type of object or other factors associated with the request.

If it is determined that the size of the requested object is less than or equal to the threshold retrieval size, then at stage 308, the cache returns the requested object in its entirety to the cache client. Having returned the entire object to the client, the request servicing is complete and method 300 terminates.

On the other hand, if the size of the requested object is greater than the threshold retrieval size, then the processing of method 300 proceeds to stage 310. At stage 310, a content-id is determined for the requested object. The content-id, as described above, may be generated by the cache to identify the particular instance of the object being returned to the cache client. In the event that a concurrent write to the same object occurs in the cache, then the content-id may be used to distinguish between the instances (e.g., the instance from which the object was returned to the cache client and the instance created for the concurrent write) of the object.

At stage 312, the portion of the requested object to be returned to the cache client in response to the current request is determined. The portion to be returned may be based on a preconfigured size. For example, a portion to be returned may have a size equal to the threshold retrieval size. In another embodiment, the size of the portion may be determined dynamically based upon system factors, such as, but not limited to, current traffic between cache and cache client, and a priority level of the request. When the current traffic between the cache and the cache client is lower than a configured threshold, the size of the portion may be set to a larger value, and when the traffic is above the threshold, the size of the portion may be set to a smaller value. If a priority level is indicated in the request, the cache may configure larger sizes of portions for the highest priority requests, and smaller sizes for the lower priority requests. The size of the portion to be returned may be configured so that the cache client can begin transmitting the response to the requesting web client with minimal latency, and so that the cache client can continuously transmit (e.g., stream) the content of the object returned by the cache in portions to the requesting web client.

At stage 314, a lookup-id is determined for the portion to be returned. The lookup-id, in combination with the content-id, may be used to keep track of the next portions to be returned of a requested object. The lookup-id may be a value (e.g., in bytes) of the total size of the portion(s) already returned. In another embodiment, the lookup-id may be a pointer to the location (in cache memory) of the portion to be returned next. According to an embodiment, the lookup-id may be generated so that, the combination of the associated content-id and lookup-id, is unique for requests over some time interval. For example, a portion of the lookup-id may represent an identifier for a HTTP session between the proxy server/cache client and web client.

At stage 316, the selected portion of the object is returned to the cache client from the cache. Along with the selected portion, the content-id and the lookup-id are returned to the cache client. The content-id, as noted before, identifies the particular instance of the requested object from which data is being returned. The lookup-id, as noted before, is used to keep track of the next data portion of the requested object to be returned. In some other embodiments, the cache may not return a lookup-id to the cache client, and may return the content-id and an indication of whether more portions are to be transmitted.

Figure 6:
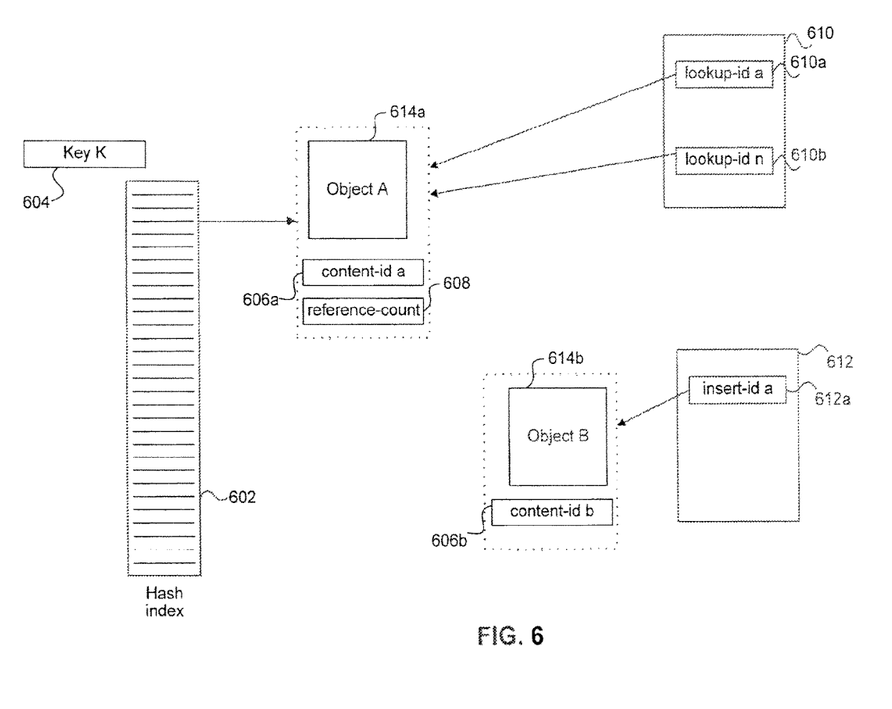
FIG. 6 illustrates a data structure to manage cache lookup and insertion, according to an embodiment.

The cache may maintain internal tables or other data structures to keep track of the next portions to be returned for objects that are being currently read by one or more cache clients on behalf of one or more web clients. Moreover, internal data structures are maintained by the cache for providing an index to cached content (e.g., cached objects). FIG. 6 illustrates an exemplary internal data structures maintained by the cache for facilitating access to cached objects.

At stage 318, the cache can update its internal data structures, as necessary, to reflect the status of the servicing of the current request by the cache client. For example, a lookup-id may be associated with the content-id corresponding to the requested object, and the lookup-id may be updated to represent the next portion of the requested object to be returned. A reference-count associated with the content-id may be incremented, if necessary. The reference-count indicates that the content-id associated with that reference-count has an ongoing read operation. If a reference-count is greater than 0, then the associated instance of the object represented by the content-id may not be removed from cache.

At stage 320, it is determined whether any more portions of the requested object are to be returned to the cache client. This determination may be made based upon the total size of the requested object and the total size of the portions that have already been returned.

If no more portions are to be returned, then the retrieval of the requested object has been completed and method 300 terminates. If it is determined that more portions are to be returned to the cache client, then at stage 322, the cache can wait for a follow-on request to retrieve the next portion.

At stage 324, a follow-on request is received for the next portion of the requested object. According to an embodiment, the follow-on request includes the content-id identifying the instance of the requested object being read, and the lookup-id which indicates the next portion to be read. According to another embodiment, the follow-on request includes the content-id and relies upon the cache to use its internal tables to return the correct portions of the object.

At stage 326, based upon the received follow-on request, the cache finds the next portion to be returned of the requested object. The cache can use one or more of the cache key, the content-id, and the lookup-id included with the follow-on request to find the next portion to be returned. Stages 312-326 can be repeated until all portions of the requested object have been returned from the cache to the cache client.

Figure 4:
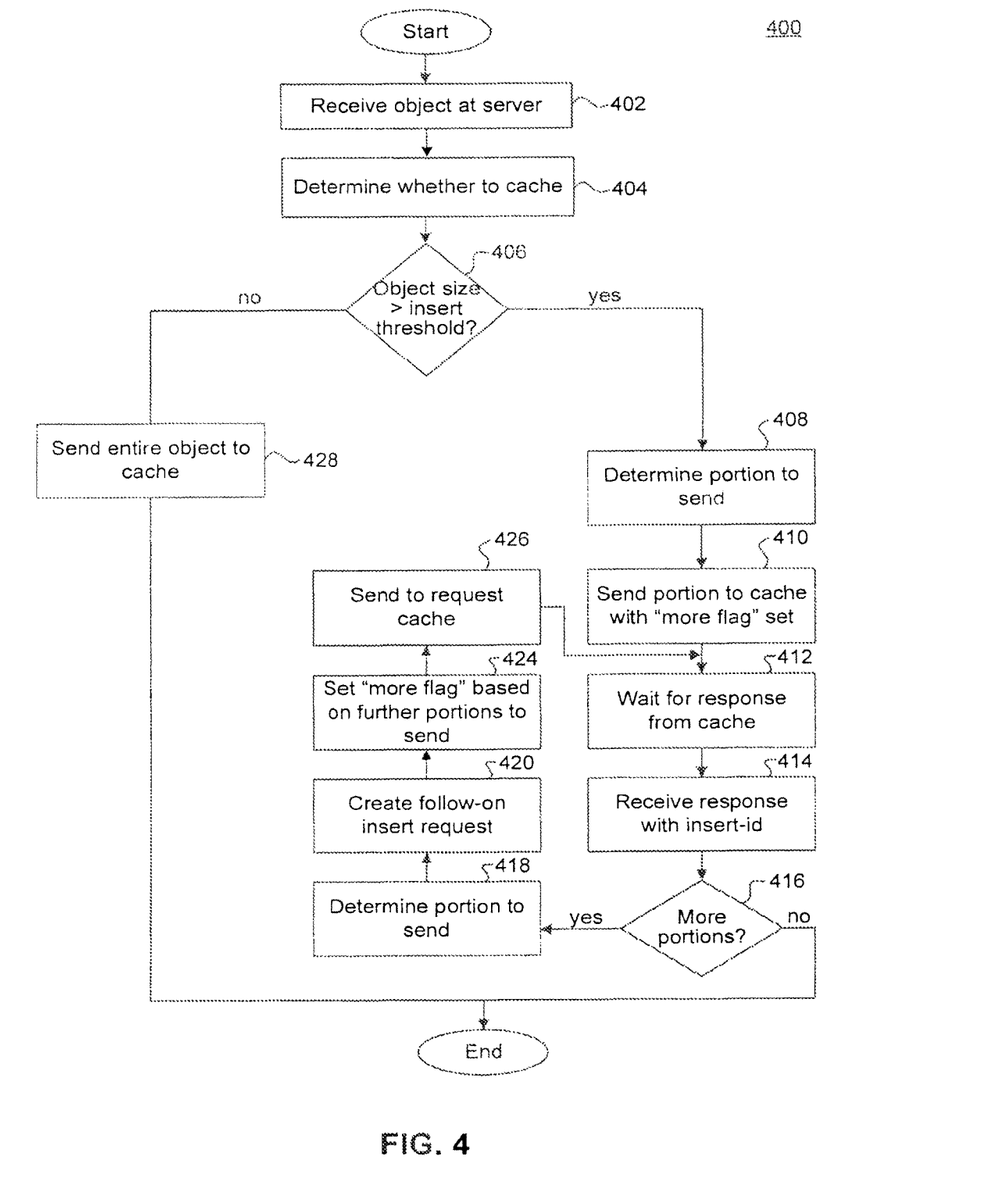
FIG. 4 illustrates a flowchart of a method for cache client to write to a cache, according to an embodiment.

FIG. 4 illustrates a flowchart of a method 400 (stages 402-428) for inserting an object into a cache, in accordance with an embodiment. According to an embodiment, method 400 may be used by cache client 112 of proxy server 108 when it receives an object to be cached (i.e., to be written to cache memory) from origin server 102 or another source. Cache client 112 may use method 400 to insert an object or to update a cached object in a cache by communicating the object to the cache as a series of portions.

At stage 402, an object or a portion of an object is received at the proxy server. The received object or the portion of the object may be streamed from a source, such as an origin server 102, to the proxy server to be served to a web client that requested the object. The object may be streamed, for example, using HTTP streaming from an origin server to a proxy server.

At stage 404, the web proxy may determine whether the object should be cached. The determination as to which objects are cached and which are not can be configurable. The determination may be based upon one or more factors, such as, but not limited to, the type of object, identity of the requesting web client, size of object, network performance metrics and cache performance metrics. According to another embodiment, the determination of whether to cache the object may be made dynamically based upon system conditions, for example, indicated by performance metrics for the network(s) and/or caches.

At stage 406, it is determined whether the size of the object is greater than a threshold insertion size. The threshold insertion size represents a minimum size of an object that is to be inserted in portions into the cache by the web proxy. The threshold insertion size may be a configured parameter, or in some embodiments, may be determined dynamically. According to an embodiment, the threshold insertion size may be set at a value determined so that only a specified amount of memory in the proxy server is consumed by the object at any time. For example, the proxy server can write any one or more portions of the object that causes the memory consumed by the object to exceed the specified limit.

If, at stage 406, it is determined that the size of the object is not greater than the threshold insertion size, then method 400 proceeds to stage 426. At stage 426, the object is sent to the cache as a single object. After sending the object to the cache at stage 426, method 400 terminates.

If, at stage 406, it is determined that the size of the object is greater than the threshold insertion size, then at stage 408, a portion of the object to be transmitted to the cache is selected. The selected portion may be from the beginning of the object, up to a predetermined size. The size of the portions may be configured, or may be dynamically determined.

At stage 410, an insert request is formed and transmitted to the cache. The insert request may include a header portion indicating that the message is an insert request, the selected portion of the object, and a flag indicating that more portions of the object are to be sent from the proxy server to the cache. The formed insert request is then transmitted to the cache.

At stage 412, the proxy server waits for a response from the cache. According to an embodiment, the waiting can be performed by a thread or process spawned in the proxy server, while the rest of the proxy server continues to serve incoming client requests.

At stage 414, a response to the insert request is received from the cache. The received insert response may include an incremental insert identifier containing a content-id and an insert identifier (insert-id). The content-id, as noted above, identifies the particular instance of the object in the cache. A separate copy (i.e., an instance) of the object may be created in the cache for the object being written. The insert-id is a value generated by the cache, and identifies the next portion of the object to be written.

At stage 416, the proxy server determined whether there are more portions to be sent to the cache. According to an embodiment, this determination may be based upon the status of the HTTP streaming of the object from the origin server or other source to the proxy server.

If, at stage 416, it is determined that no more portions of the current object are to be sent to the cache, then the entire object has been transmitted to the cache and method 400 can terminate.

If, at stage 416, it is determined that more portions of the current object are yet to be sent to the cache, processing of method 400 proceeds to stage 418. At stage 418, the next portion of the current object to be sent to the cache is selected. The portion to be sent may be selected in a manner similar to the selection of the portion at stage 408.

At stage 420, a follow-on insert request is formed by the proxy server. The follow-on insert request may include the selected portion of the object and information to identify the instance of the associated object in the cache. According to an embodiment, the content-id and the insert-id received earlier from the cache are included in the follow-on insert request. Moreover, the follow-on insert request can also include a flag to communicate to the cache whether more portions are to be expected.

At stage 422, based on a determination whether more portions of the current object are to be transmitted to the cache in addition to the currently formed follow-on insert request, a flag in the follow-on insert request is marked. The flag may have binary semantics to indicate, based on its value, either that more portions are to follow, or that the current portion is the last portion of the object.

At stage 424, the follow-on insert request is transmitted to the cache.

Stages 412-424 may be repeated for each portion of the object, until the entire object is transmitted from the proxy server to the cache.

Figure 5:
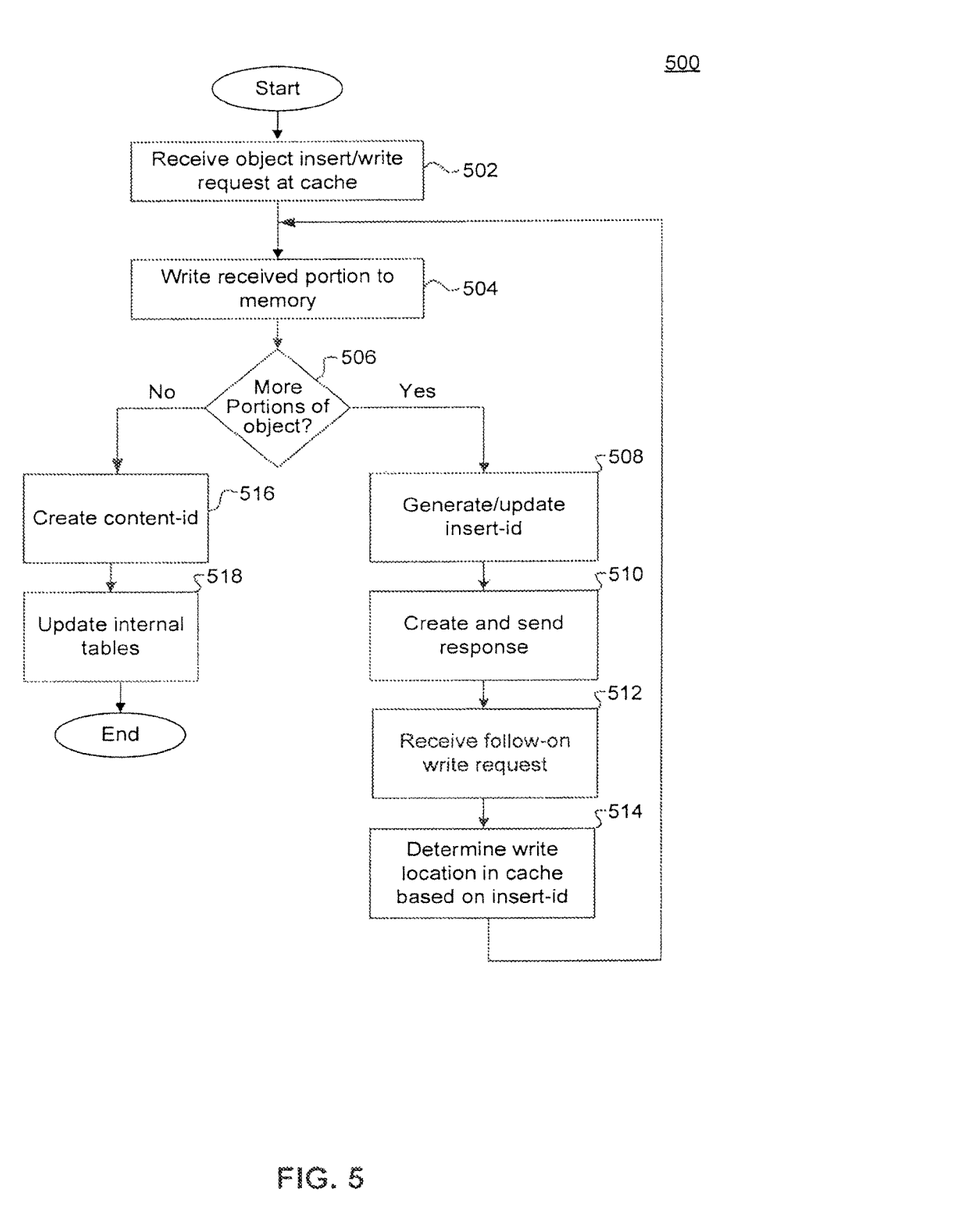
FIG. 5 illustrates a flowchart of a method for a cache to write cache data, according to an embodiment.

FIG. 5 illustrates a flowchart of a method 500 (stages 502-518) for writing an object into a cache, in accordance with an embodiment. According to an embodiment, method 500 may be used by cache 114 when it receives an object to be cached from cache client 112. Method 500 enables incrementally inserting an object, or updating an object, in a cache by communicating the object to the cache as a series of portions.

At stage 502, a request to insert an object is received at the cache. The insert request may be originated from the proxy server. The insert request can include a portion of an object to be inserted into the cache, and a flag indicating that more portions of the object will follow. The insert request can also include information about the object, such as, but not limited to, its URL. According to another embodiment, the proxy server may calculate a key based upon information regarding the object, such as, its URL, and include the key in the insert request.

At stage 504, the received portion of the object is written to cache memory. When stage 504 is reached for the first insert request regarding an update or insert of a particular object, the memory location to be written to may be determined in accordance with any suitable technique for determining a location for writing a new object to the cache.

At stage 506, it is determined whether more portions of the object are to be received to be cached. The insert request may include a flag or other field indicating whether more portions of the object are yet to be received by the cache.

If, at stage 506, it is determined that more portions are to be received, then at stage 508, an insert identifier (insert-id) is generated for the object being incrementally inserted. The insert-id indicates the portion of the object to be updated next. According to an embodiment, the insert-id may include a memory address where the next received portion of the object is to be written to. The insert-id may also identify the location of the object in cache memory.

At stage 510, a response to the insert request is generated at the cache. The response includes the insert-id generated in stages 508. The response may also include other parameters associated with the object being updated, such as its cache key or its content-id, if one is generated before the entire object is inserted. The generated response is sent to the cache client.

At stage 512, a follow-on request to incrementally insert the next portion of the object is received at the cache. The one or more follow-on requests to incrementally insert an object includes the insert-id returned by the cache after the previous portion was written to cache memory.

At stage 514, the cache memory location where the received portion is to be written is determined. According to an embodiment, the insert-id received with the follow-on request indicates the address to be written to. According to another embodiment, the insert-id is used to access a data structure maintained by the cache indicating the next location to be written to for each of the object instances that are currently being written to.

After determining the location to be written to, the portion is written to the determined location at stage 504. Stages 504 to 514 are repeated until the respective portions corresponding to the entire object are received at the cache.

When, at stage 506, it is determined that the all portions have been received at the cache, method 500 proceeds to stage 516. At stage 516, a content-id is generated for the newly written object. According to another embodiment, however, the content-id for the newly written object may have been generated earlier, before the completion of receiving all portions. For example, the content-id may have been generated when the first request to insert a particular object is received, before receiving any follow-on insert requests for that object. As noted above, the content-id uniquely identifies an instance of an object in cache memory. The content-id may include the address in the cache where the beginning of the object is stored, or may be otherwise associated with the location whether the object is stored.

The internal data structures of the cache are updated in stage 518. Updating of internal data structures may include incorporating the newly inserted object into the cache so that a cache lookup with the corresponding cache key would access the newly inserted object.

When a newly inserted object is ready to be incorporated into the cache so that it is reachable through a cache lookup using a corresponding cache key, there may or may not be other cached instances of the same object in the cache. For example, if the object was previously inserted, then an instance of that object may already be reachable through a corresponding cache key. When another instance of the object is present in the cache, then before incorporating the newly written instance of the object into the cache, the earlier instance may be removed from the cache. However, a cached object may only be removed from the cache when there are no ongoing accesses to that object. As described above, a reference-count associated with each cached object may indicate the number of ongoing accesses to that object.

After the internal tables are updated to incorporate the newly inserted object into the cache, the insert operation has completed, and method 500 terminates.

FIG. 6 illustrates a sketch representing a data structures that may be used to manage cache operations, in accordance with an embodiment. An incremental cache, such as cache 114, can maintain a hashed-index 602 which may map cache keys, such as key K 604, to cached objects. For example, hashed-index 602 may map cache key K 604 to a cached object, such as, object A 614a. The instance of a particular object that is mapped from the hashed-index may be referred to as a "canonical object instance."

In order to enable concurrent lookup and insert of the same object, the incremental cache may, at times, have more than one instance of a particular object. For example, if the canonical instance of a particular object is being currently read by one or more users or clients, a concurrent write to the same object would generate a second instance of that object in the cache. For example, object B 614b may be created in response to an insert operation, and may be a second instance of the object corresponding to canonical object instance 614a. During the incremental insert operation, an insert-id 612a from an index 612 of insert-ids may maintain a mapping to object B 614b. Object B 614b may have its own content-id that uniquely identifies it.

A content-id is associated with each cached object, and uniquely identifies the object. According to an embodiment, each instance of an object has its own unique content-id. As illustrated in FIG. 6, a content-id 606a is associated with cached object 614a, and content-id 606b is associated with newly inserted object B 614b. Content-ids 606a and 606b uniquely identify their respective associated object instances in the cache.

Each canonical object instance can also be associated with a reference count that keeps track of the number of read operations that are currently being performed on that object. For example, as illustrated in FIG. 6, cached object 614a may be associated with reference-count 608.

Some of the canonical object instances may also be mapped from an index of lookup identifiers. For example, as illustrated in FIG. 6, lookup-id 610a and lookup-id 610b of an index 610 of lookup-ids may map to object A 614a. In the example, lookup-id 610a and lookup-id 610b correspond, respectively, to two ongoing concurrent lookup operations upon object A 614a.

Figure 7:
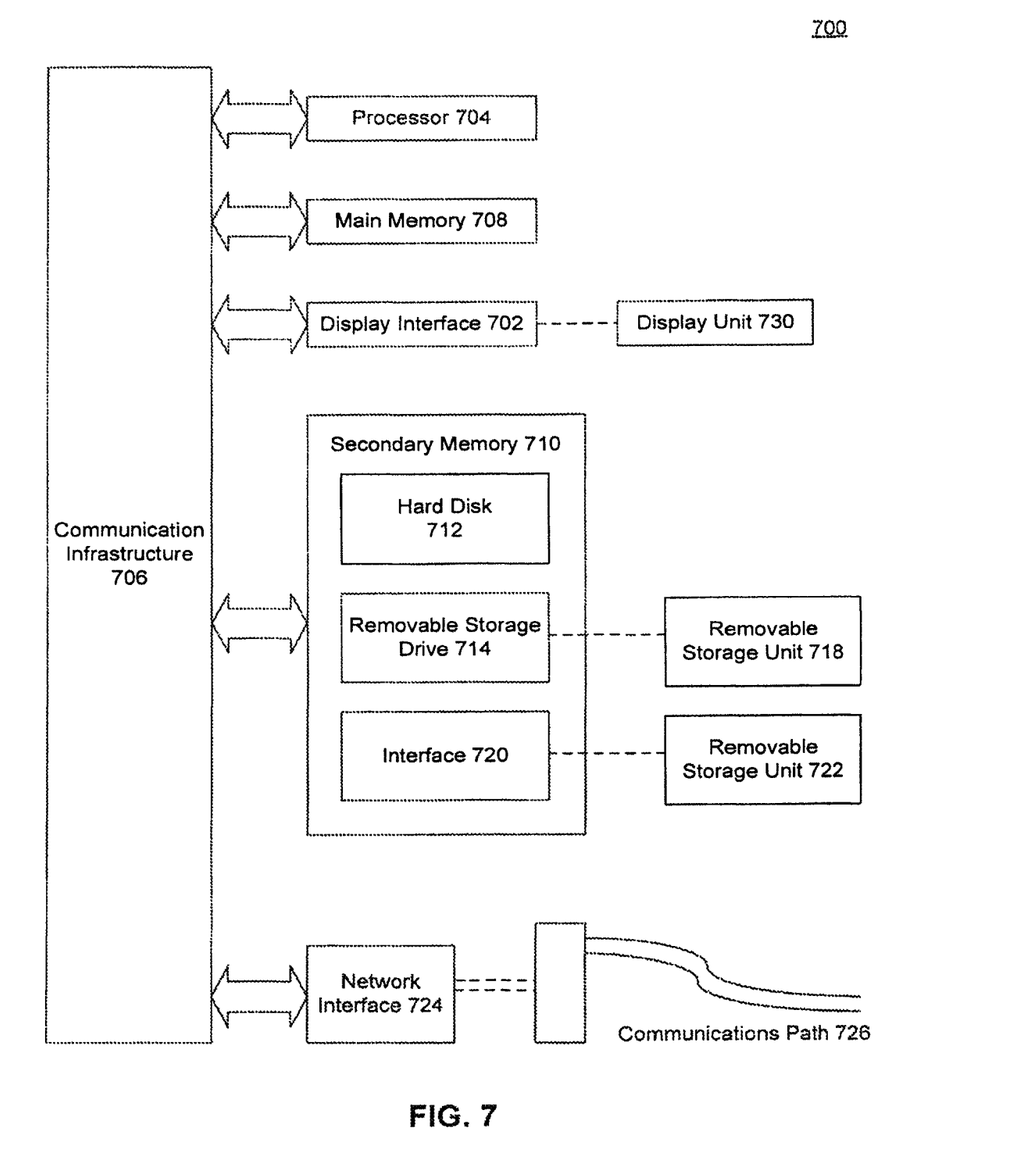
FIG. 7 illustrates a computer system in which embodiments of may be executed.

FIG. 7 illustrates an example computer 700 in which the embodiments described herein, or portions thereof, may be implemented as computer-readable code. For example, cache client 114, cache interface 113 or any of their modules can be executed on one or more computer systems 700 using hardware, software, firmware, computer readable storage media having instructions stored thereon, or a combination thereof.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor device may be a single processor, a plurality of processors, or combinations thereof. Processor devices may have one or more processor "cores."

Various embodiments are described in terms of this example computer system 700. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 704 may be a single processor in a multi-core/multiprocessor system, such system operating alone, or in a cluster of computing devices operating in a cluster or server farm. Processor device 704 is connected to a communication infrastructure 706, for example, a bus, message queue, network, or multi-core message-passing scheme. Computer system 700 may also include display interface 702 and display unit 730.

Computer system 700 also includes a main memory 708, for example, random access memory (RAM), and may also include a secondary memory 710. Secondary memory 710 may include, for example, a hard disk drive 712, and removable storage drive 714. Removable storage drive 714 may include a floppy disk drive, a magnetic tape drive, an optical disk drive, a flash memory drive, or the like. The removable storage drive 714 reads from and/or writes to a removable storage unit 718 in a well-known manner. Removable storage unit 718 may include a floppy disk, magnetic tape, optical disk, flash memory drive, etc. which is read by and written to by removable storage drive 714. As will be appreciated by persons skilled in the relevant art, removable storage unit 718 includes a computer readable storage medium having stored thereon computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 may be in the form of signals, which may be electronic, electromagnetic, optical, or other signals capable of being received by communications interface 724. These signals may be provided to communications interface 724 via a communications path 726. Communications path 726 carries signals and may be implemented using wire or cable, fiber optics, a phone line, a cellular phone link, an RF link or other communications channels.

In this document, the terms "computer storage medium" and "computer readable storage medium" are used to generally refer to media such as removable storage unit 718, removable storage unit 722, and a hard disk installed in hard disk drive 712. Computer storage medium and computer readable storage medium may also refer to memories, such as main memory 708 and secondary memory 710, which may be memory semiconductors (e.g., DRAMs, etc.).

Computer programs (also called computer control logic) are stored in main memory 708 and/or secondary memory 710. Computer programs may also be received via communications interface 724. Such computer programs, when executed, enable computer system 700 to implement the embodiments described herein. In particular, the computer programs, when executed, enable processor device 704 to implement the processes of the embodiments, such as the stages in the methods illustrated by flowcharts of FIGS. 2-5 and data structures illustrated in FIG. 6, discussed above. Accordingly, such computer programs represent controllers of computer system 700. Where an embodiment is implemented using software, the software may be stored in a computer storage medium and loaded into computer system 700 using removable storage drive 714, interface 720, and hard disk drive 712, or communications interface 724.

Embodiments of the invention also may be directed to computer program products including software stored on any computer readable storage medium. Such software, when executed in one or more data processing device(s), causes a data processing device(s) to operate as described herein. Examples of computer readable storage mediums include, but are not limited to, primary storage devices (e.g., any type of random access memory) and secondary storage devices (e.g., hard drives, floppy disks, CD ROMS, ZIP disks, tapes, magnetic storage devices, and optical storage devices, MEMS, nanotechnological storage device, etc.).

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of caching, comprising:
   comparing, to a threshold insert size, a size of a data item to be written to a cache;
   transmitting, responsive to determining that the size of the data item is greater than the threshold insert size, a first request to write the data item to the cache, wherein the first request includes a first portion of the data item and an indication that more portions of the data item are to follow, thereby causing the first portion of the data to be inserted into the cache;
   receiving one or more responses from the cache, wherein each of the responses includes an incremental insert indicator, the incremental insert indicator updated for each response; and
   responsive to each of the received one or more responses, transmitting a follow-on request to the cache including a next portion of the data item and the corresponding incremental insert indicator, thereby causing each next portion of the data item to be inserted into the cache at an address corresponding to the incremental insert indicator in the follow-on request.

2. The method of claim 1, further comprising:
   receiving the first request at the cache;
   writing the first portion to the cache;
   updating the incremental insert indicator responsive to determining that, based upon the indication in the received first request, more portions of the data item are to be written to the cache; and
   transmitting a first response to a client, wherein the first response includes the updated incremental insert indicator.

3. The method of claim 2, wherein the updating is based upon an address in the cache to store a next portion of the data item.

4. The method of claim 2, further comprising:
   receiving a particular one of the one or more follow-on requests;
   extracting the next portion from the particular follow-on request;
   inserting the next portion in the cache at an address based upon the incremental insert indicator in the particular follow-on request;
   updating the incremental insert indicator; and
   transmitting a response to a client including the updated incremental insert indicator.

5. The method of claim 1, comprising:
   forming the first request to write the data item to the cache with the first portion of the data item;
   waiting for a first response from the cache, responsive to the first request, the first response including a content identifier; and
   forming the follow-on request to the cache including the next portion of the data item with the content identifier from the first response.

6. The method of claim 5, wherein the content identifier identifies a particular instance of an object in the cache for the data item being written to the cache.

7. The method claim 1, comprising:
   calculating a key based on information about the data item to be written to the cache; and
   including the calculated key in the first request to write the data item to the cache, the information about the data item including at least an identifier for the data item.

8. The method of claim 7, wherein the identifier for the data item to be written to the cache is a uniform resource locator ("URL").

9. The method of claim 1, wherein a proxy server transmits the first request to write the data item to the cache, the method further comprising dynamically determining the threshold insert size based on an amount of memory in the proxy server consumed by the data item.

10. A system for caching, the system comprising a server configured for communication with a cache, wherein the server comprises a computer processor and a computer-readable memory storing instructions that, when executed the computer processor, cause the computer processor to:

compare, to a threshold insert size, a size of a data item to be written to the cache;

transmit, responsive to determining that the size of the data item is greater than the threshold insert size, a first request to write the data item to the cache, wherein the first request includes a first portion of the data item and an indication that more portions of the data item are to follow, thereby causing the first portion of the data to be inserted into the cache;

receive one or more responses from the cache, wherein each of the responses includes an incremental insert indicator, the incremental insert indicator updated for each response; and responsive to each of the received one or more responses, transmit a follow-on request to the cache including a next portion of the data item and the corresponding incremental insert indicator, thereby causing each next portion of the data item to be inserted into the cache at an address corresponding to the incremental insert indicator in the follow-on request.

11. The system of claim 10, further comprising the cache, wherein the cache is configured to:
receive the first request;
write the first portion to a cache memory;
update the incremental insert indicator responsive to determining that, based upon the indication in the received first request, more portions of the data item are to be written to the cache; and
transmit a first response to the server, wherein the first response includes the updated incremental insert indicator.

12. The system of claim 11, wherein the cache is further configured to update the incremental insert indicator based upon an address in the cache memory to store a next portion of the data item.

13. The system of claim 11, wherein the cache is further configured to:
receive a particular one of the one or more follow-on requests;
extract the next portion from the particular follow-on request;
insert the next portion in the cache memory at an address based upon the incremental insert indicator in the particular follow-on request;
update the incremental insert indicator; and
transmit a response to the server including the updated incremental insert indicator.

14. The system of claim 10, wherein the instructions, when executed by the computer processor, further cause the computer processor to:
form the first request to write the data item to the cache with the first portion of the data item;
wait for a first response from the cache, responsive to the first request, the first response including a content identifier; and
form the follow-on request to the cache including the next portion of the data item with the content identifier from the first response.

15. The system of claim 14, wherein the content identifier identifies a particular instance of an object in the cache for the data item being written to the cache.

16. The system of claim 10, wherein the instructions, when executed by the computer processor, further cause the computer processor to:
calculate a key based on information about the data item to be written to the cache; and
include the calculated key in the first request to write the data item to the cache, the information about the data item including at least an identifier for the data item.

17. The system of claim 10, wherein the instructions, when executed by the computer processor, further cause the computer processor to dynamically determine the threshold insert size based on an amount of memory in the server consumed by the data item.

18. A non-transitory computer-readable medium storing instructions that, when executed by a computer processor, cause the computer processor to:
compare, to a threshold insert size, a size of a data item to be written to a cache;
transmit, responsive to determining that the size of the data item is greater than the threshold insert size, a first request to write the data item to the cache, wherein the first request includes a first portion of the data item and an indication that more portions of the data item are to follow, thereby causing the first portion of the data to be inserted into the cache;
receive one or more responses from the cache, wherein each of the responses includes an incremental insert indicator, the incremental insert indicator updated for each response; and
responsive to each of the received one or more responses, transmit a follow-on request to the cache including a next portion of the data item and the corresponding incremental insert indicator, thereby causing each next portion of the data item to be inserted into the cache at an address corresponding to the incremental insert indicator in the follow-on request.

19. The non-transitory computer-readable medium of claim 18, further storing instructions that, when executed by the computer processor, cause the computer processor to:
form the first request to write the data item to the cache with the first portion of the data item;
wait for a first response from the cache, responsive to the first request, the first response including a content identifier; and
form the follow-on request to the cache including the next portion of the data item with the content identifier from the first response, wherein the content identifier identifies a particular instance of an object in the cache for the data item being written to the cache.

20. The non-transitory computer-readable medium of claim 18, further storing instructions that, when executed by the computer processor, cause the computer processor to:
calculate a key based on information about the data item to be written to the cache; and
include the calculated key in the first request to write the data item to the cache, the information about the data item including at least an identifier for the data item.

* * * * *